United States Patent
Zhou et al.

(10) Patent No.: US 9,854,555 B2
(45) Date of Patent: Dec. 26, 2017

(54) METHOD AND SYSTEM FOR NOTIFYING ACCESS NETWORK LOCATION INFORMATION

(71) Applicant: ZTE Corporation, Shenzhen, Guangdong (CN)

(72) Inventors: Xingyue Zhou, Shenzhen (CN); Jianjie You, Shenzhen (CN); Chunhui Zhu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/428,014

(22) PCT Filed: Sep. 12, 2013

(86) PCT No.: PCT/CN2013/083423
§ 371 (c)(1),
(2) Date: Mar. 13, 2015

(87) PCT Pub. No.: WO2014/040552
PCT Pub. Date: Mar. 20, 2014

(65) Prior Publication Data
US 2015/0237594 A1    Aug. 20, 2015

(30) Foreign Application Priority Data
Sep. 14, 2012 (CN) .......................... 2012 1 0341761

(51) Int. Cl.
*H04W 4/00* (2009.01)
*H04W 64/00* (2009.01)
(Continued)

(52) U.S. Cl.
CPC ......... *H04W 64/003* (2013.01); *H04M 15/66* (2013.01); *H04W 8/08* (2013.01); *H04W 80/04* (2013.01)

(58) Field of Classification Search
None
See application file for complete search history.

(56) References Cited

U.S. PATENT DOCUMENTS

2008/0176560 A1* 7/2008 Dutta ................ H04W 12/06
455/433
2010/0223365 A1* 9/2010 Liebsch ............ H04W 36/0016
709/221

(Continued)

FOREIGN PATENT DOCUMENTS

CN    101977246 A    2/2011
CN    102075907 A    5/2011
(Continued)

OTHER PUBLICATIONS

International Search Report in international application No. PCT/CN2013/083423, dated Dec. 12, 2013.
(Continued)

*Primary Examiner* — Phirin Sam
(74) *Attorney, Agent, or Firm* — Oppedahl Patent Law Firm LLC

(57) ABSTRACT

A method and a system for notifying access network location information are provided. The method includes that in a PMIPv6 architecture, a Mobile Access Gateway (MAG) sends a circuit ID to a Local Mobility Anchor (LMA) by carrying the circuit ID in a proxy binding update message; and in a GTP architecture, a local GTP peer sends a circuit ID to a correspondent GTP peer by carrying the circuit ID in a Create Session Request message, a Modify Bearer Request message or a Delete Session Request message. In the disclosure, an MAG can notify an LMA of access network location information of a UE in a PMIPv6 architecture, and a GTP peer can notify a correspondent GTP peer of access network location information of a UE in a GTP architecture.

10 Claims, 2 Drawing Sheets

(51) Int. Cl.
*H04M 15/00* (2006.01)
*H04W 8/08* (2009.01)
*H04W 80/04* (2009.01)

(56) References Cited

U.S. PATENT DOCUMENTS

| | | | |
|---|---|---|---|
| 2010/0238864 A1* | 9/2010 | Hirano | H04W 60/005 370/328 |
| 2010/0268804 A1 | 10/2010 | Aso | |
| 2010/0278070 A1 | 11/2010 | Melia | |
| 2010/0309846 A1* | 12/2010 | Rune | H04L 12/5691 370/328 |
| 2011/0103260 A1* | 5/2011 | Jeyatharan | H04W 60/005 370/254 |
| 2011/0238822 A1* | 9/2011 | Weniger | H04W 80/045 709/224 |
| 2011/0320323 A1 | 12/2011 | Cuervo | |
| 2012/0044949 A1* | 2/2012 | Velev | H04W 8/082 370/401 |
| 2012/0120872 A1* | 5/2012 | Korhonen | H04W 8/12 370/328 |
| 2012/0155313 A1* | 6/2012 | Hirano | H04W 48/14 370/252 |
| 2012/0172036 A1 | 7/2012 | Bhalla | |
| 2012/0252355 A1* | 10/2012 | Huang | H04W 36/0033 455/7 |
| 2012/0322406 A1 | 12/2012 | Cuervo | |
| 2013/0138823 A1* | 5/2013 | Centemeri | H04W 76/022 709/228 |
| 2013/0139221 A1* | 5/2013 | Gundavelli | H04W 28/02 726/4 |
| 2013/0308526 A1* | 11/2013 | Jaiswal | H04W 88/16 370/328 |
| 2013/0324125 A1* | 12/2013 | Bachmann | H04W 36/0066 455/436 |
| 2013/0344890 A1* | 12/2013 | Hahn | H04W 60/00 455/456.1 |
| 2014/0003357 A1* | 1/2014 | Ejzak | H04W 76/021 370/329 |
| 2015/0180945 A1* | 6/2015 | Hall | H04W 4/20 709/203 |
| 2015/0181394 A1* | 6/2015 | Zuniga | H04W 72/005 370/312 |

FOREIGN PATENT DOCUMENTS

| | | |
|---|---|---|
| CN | 102340763 A | 2/2012 |
| CN | 102611761 A | 7/2012 |
| JP | 2012142947 A | 7/2012 |
| JP | 2012147093 A | 8/2012 |
| JP | 2012253495 A | 12/2012 |
| WO | 2010146815 A1 | 12/2010 |

OTHER PUBLICATIONS

English Translation of the Written Opinion of the International Search Authority in international application No. PCT/CN2013/083423, dated Dec. 12, 2013.

Supplementary European Search Report in European application No. 13837442.6, dated Sep. 11, 2015, 7 pgs.

3rd Generation Partnership Project; Technical Specification Group Services and System Aspects; Architecture enhancements for non-3GPP accesses (Release 11), mailed on Jun. 30, 2012.

* cited by examiner

US 9,854,555 B2

METHOD AND SYSTEM FOR NOTIFYING ACCESS NETWORK LOCATION INFORMATION

RELATED APPLICATIONS

This application is a 35 U.S.C. 371 national stage filing from International Application No. PCT/CN2013/083423, filed Sep. 12, 2013, and claims priority to Chinese Application No. 201210341761.4, filed Sep. 14, 2012, the teachings of which are incorporated herein by reference.

TECHNICAL FIELD

The disclosure relates to the field of communications, and more particularly to a method and a system for notifying access network location information.

BACKGROUND

A 3rd Generation Partnership Project (3GPP) Evolved Packet System (EPS) consists of an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a Policy and Charging Rules Function (PCRF) entity and other supporting nodes.

The MME is responsible for mobility management, the processing of the signaling of a non-access layer, the management of user mobility management context and other related work of a control plane; the S-GW, which is an access gateway device connected with an E-UTRAN, forwards data between the E-UTRAN and the P-GW and caches paging-waiting data; the P-GW, which is a border gateway of an EPS and a Packet Data Network (PDN), is responsible for the access of the PDN, the data forwarding between the EPS and the PDN, and other functions; the PCRF, which is a policy and charging rules function entity, is connected with an operator Internet Protocol (IP) service network via a Receiving Interface (Rx) to acquire service information, besides, the PCRF is also connected with a gateway device in a network via a Gx/Gxa/Gxc interface to take charge of initiating the establishment of an IP bearer, guaranteeing the Quality of Service (QoS) of service data, and controlling charging.

The EPS supports the intercommunication with a non-3GPP access network and achieves the intercommunication with the non-3GPP access network by means of an S2a/S2b/S2c interface. The non-3GPP access network includes a trusted non-3GPP access network and an untrusted non-3GPP access network. The IP access of the trusted non-3GPP network can be directly connected with the P-GW via an S2a interface while the IP access of the untrusted non-3GPP network is connected with the P-GW via an Evolved Packet Data Gateway (ePDG); and the interface between the ePDG and the P-GW is an S2b interface.

Proxy Mobile IPv6 (PMIPv6) is a network-based mobility IP management protocol according to which no mobile device is needed for any mobility management, a network is responsible for the mobility management of a user equipment, and the mobile device is unaware of the effect of a layer-3 connection brought by a movement. For a Mobile Node (MN), no matter wherever it moves, the MN considers itself on its Home Link. A PMIPv6-based 3GPP network architecture includes the following two key nodes:

a Local Mobility Anchor (LMA), which is a Home Agent of an MN, a topological anchor of a home address of the MN, and a binding router managing the MN, provides an LMA function at a P-GW in a 3GPP network and is responsible of the data forwarding between the MN and a Packet Data Network; and a Mobile Access Gateway (MAG), which shields a network layer change brought by a mobile handover and completes a binding update operation on behalf of the MN; in a 3GPP network architecture, the MAG functions is provided by a corresponding network element S-GW, a trusted non-3GPP IP access network and an ePDG.

Proxy mobility management is implemented between the LMA and the MAG via the Proxy Binding Update (PBU) message and the Proxy Binding Acknowledgement (PBA) message. The PBU message sent to the LMA by the MAG and the PBA message sent to the MAG by the LMA are present in the form of a message pair. The MAG sends a binding association between the home address of a user equipment MN and the proxy address of the MAG itself to the LMA via the PBU message, and the LMA stores the binding association so as to forward an uplink message and a downlink message of the MN through a correct route. The PBU message which is mainly for binding update, binding lifetime update and binding deletion is acknowledged by sending the PBA message from a corresponding LMA to the MAG.

As stated above, PMIPv6 is applicable to a plurality of network deployment scenarios of network-based mobility management protocols, for example, a Wireless Local Area Network (WLAN) architecture. More and more network architectures require an LMA to be capable of providing stream transmission distinguishing different services and policies according to different access networks connected. For instance, in a 3GPP mobile network system, a Policy and Charging Control (PCC) Framework and an Access Network Discovery and Selection Function (ANDSF) need to decide and provide policy rules based on access network information, for example, providing services of different transmission qualities for a roaming user and a non-roaming user, or providing different policy services according to different Service Set Identifiers (SSID) in a WLAN access scenario. In the current PMIPv6, an MAG can provide the following access network (location) information for an LMA:

Network-Identifier (SSID or PLMN information of a roaming destination, PLMN ID);
Access-Point-Name (the MAC address of an AP);
Operator-Identifier (information of AP operator); and
Geo-Location (the GPS information of a user).

As network technologies develop and more services are needed, terminal devices in a home network become more diversified and more intelligent. As a centralized intelligent interface, a Residential Gateway (RG) connects a home network with an external network to provide the connection, the general control and the coordination for the home network. At present, the International Standardization Organization Broadband Forum (BBF) is standardizing the authentication of home gateways and residual terminal devices, the scenarios involved include the authentication of the access of a residual terminal device from a BBF network via an RG. In this scenario, as shown in FIG. 1 which is a schematic diagram illustrating an architecture in which a terminal device is connected to an EPC via a BBF fixed network, a Circuit ID can serve as the location information of an access network, and here, the Circuit ID may be any one of the following items or any combination thereof:

a Router interface number, a Switching Hub port number, a Remote Access Server port number, a Frame Relay Data Link connection identifier, an Asynchronous Transfer Mode (ATM) virtual circuit number, and a Cable Data virtual circuit number.

For instance, if in the architecture shown in FIG. 1, the line from the RG to the Access Network (AN) is an ATM/Digital Subscriber Line (DSL), then a user connected with a network through the RG can be identified by atm slot/port:vpi.vci, for example, atm 3/0:100.33 (slot=3, port=0, vpi=100, vci=33), in which slot is a slot number, port is a port number, vpi is a virtual path identifier, and vci is a virtual channel identifier.

It can be known that a Circuit ID is also information identifying the location of a network where a user is located. However, an MAG is unsupportive to the notification of a Circuit ID to an LMA in existing PMIPv6 architecture, and a General Data Transfer Platform (GTP) peer is also unsupportive to the notification of a Circuit ID to a correspondent GTP peer in a GTP architecture, thus making it inconvenient in practice.

SUMMARY

In view of this, the embodiments of the disclosure are mainly intended to provide a method and a system for notifying access network location information so as to enable an MAG to notify an LMA of access network location information of a UE in a PMIPv6 architecture and enable a GTP peer to notify a correspondent GTP peer of access network location information of a UE in a GTP architecture.

To this end, the technical solutions of the disclosure are implemented as follows.

A method for notifying access network location information is provided, which includes that:
  an MAG sends a circuit ID to an LMA by carrying the circuit ID in a PBU message of PMIPv6; or
  a local General Packet Radio Service Tunneling Protocol (GTP) peer sends a circuit ID to a correspondent GTP peer by carrying the circuit ID in a Create Session Request message, a Modify Bearer Request message or a Delete Session Request message.

After the MAG sends the circuit ID to the LMA by carrying the circuit ID in the PBU message, the method may further include that:
  the LMA acquires the circuit ID carried in the PBU message and returns the acquired circuit ID to the MAG by carrying the acquired circuit ID in a PBA message.

After the MAG sends the circuit ID to the LMA by carrying the circuit ID in the PBU message, the method may further include that:
  the LMA acquires the circuit ID carried in the PBU message and sends the acquired circuit ID to a policy system and/or a charging system; and
  the policy system makes or configures corresponding policy rules according to the acquired circuit ID, and the charging system charges according to the acquired circuit ID.

After the local GTP peer sends the circuit ID to the correspondent GTP peer by carrying the circuit ID in a Create Session Request message, a Modify Bearer Request message or a Delete Session Request message, the method may further include that:
  the correspondent GTP peer acquires the circuit ID carried in the Create Session Request message, the Modify Bearer Request message or the Delete Session Request message and returns the acquired circuit ID to the local GTP peer by carrying the acquired circuit ID in a corresponding Create Session Response message, Modify Bearer Response message or Delete Session Response message.

After the local GTP peer sends the circuit ID to the correspondent GTP peer by carrying the circuit ID in the Create Session Request message, the Modify Bearer Request message or the Delete Session Request message, the method may further include that:
  the correspondent GTP peer acquires the circuit ID carried in the Create Session Request message, the Modify Bearer Request message or the Delete Session Request message and sends the acquired circuit ID to a policy system and/or a charging system; and
  the policy system makes or configures corresponding policy rules according to the acquired circuit ID, and the charging system charges according to the acquired circuit ID.

A system for notifying access network location information is also provided, which includes an MAG and an LMA in a PMIPv6 architecture or includes a local GTP peer and a correspondent GTP peer in a GTP architecture, wherein
  the MAG is configured to send a circuit ID to the LMA by carrying the circuit ID in a PBU message; and
  the local GTP peer is configured to send a circuit ID to the correspondent GTP peer by carrying the circuit ID in a Create Session Request message, a Modify Bearer Request message or a Delete Session Request message.

The LMA is configured to acquire the circuit ID carried in the PBU message and return the acquired circuit ID to the MAG by carrying the acquired circuit ID in a PBA message.

The LMA is configured to send the acquired circuit ID to a policy system which makes or configures corresponding policy rules according to the acquired circuit ID and/or a charging system which charges according to the acquired circuit ID.

The correspondent GTP peer is configured to return the acquired circuit ID to the local GTP peer by carrying the acquired circuit ID in a corresponding Create Session Response message, Modify Bearer Response message or Delete Session Response message.

The correspondent GTP peer is configured to send the acquired circuit ID to a policy system which makes or configures corresponding policy rules according to the acquired circuit ID and/or a charging system which charges according to the acquired circuit ID.

The method and the system for notifying access network location information provided herein enable an MAG to notify an LMA of access network location information of a UE in a PMIPv6 architecture and enable a GTP peer to notify a correspondent GTP peer of access network location information of a UE in a GTP architecture.

DETAILED DESCRIPTION

The technical solution of the disclosure is described below in detail with reference to accompanying drawings when read in conjunction with specific embodiments.

A method for notifying access network location information provided in an embodiment of the disclosure mainly includes that:

in a PMIPv6 architecture, an MAG sends a circuit ID to an LMA by carrying the circuit ID in a PBU message; or in a GTP architecture, a local GTP peer sends a circuit ID to a correspondent GTP peer by carrying the circuit ID in a Create Session Request message, a Modify Bearer Request message or a Delete Session Request message.

After the MAG sends a circuit ID to the LMA by carrying the circuit ID in the PBU message, the method may further include that:

the LMA acquires the circuit ID carried in the PBU message and returns the acquired circuit ID to the MAG by carrying the acquired circuit ID in a PBA message.

After the MAG sends a circuit ID to the LMA by carrying the circuit ID in the PBU message, the method may further include that:

the LMA acquires the circuit ID carried in the PBU message and sends the acquired circuit ID to a policy system and/or a charging system (e.g. an Online/Offline Charging System); and the policy system makes or configures corresponding policy rules according to the acquired circuit ID, and the charging system charges according to the acquired circuit ID.

After the local GTP peer sends a circuit ID to the correspondent GTP peer by carrying the circuit ID in the Create Session Request message, the Modify Bearer Request message or the Delete Session Request message, the method may further include that:

the correspondent GTP peer acquires the circuit ID carried in the Create Session Request message, the Modify Bearer Request message or the Delete Session Request message and returns the acquired circuit ID to the local GTP peer by carrying the acquired circuit ID in a corresponding Create Session Response message, Modify Bearer Response message or Delete Session Response message.

After the local GTP peer sends the circuit ID to the correspondent GTP peer by carrying the circuit ID in the Create Session Request message, the Modify Bearer Request message or the Delete Session Request message, the method may further include that:

the correspondent GTP peer acquires the circuit ID carried in the Create Session Request message, the Modify Bearer Request message or the Delete Session Request message and sends the acquired circuit ID to a policy system and/or a charging system; and the policy system makes or configures corresponding policy rules according to the acquired circuit ID, and the charging system charges according to the acquired circuit ID.

The foregoing method for notifying access network location information is described below in detail in combination with specific embodiments.

Figure 1:
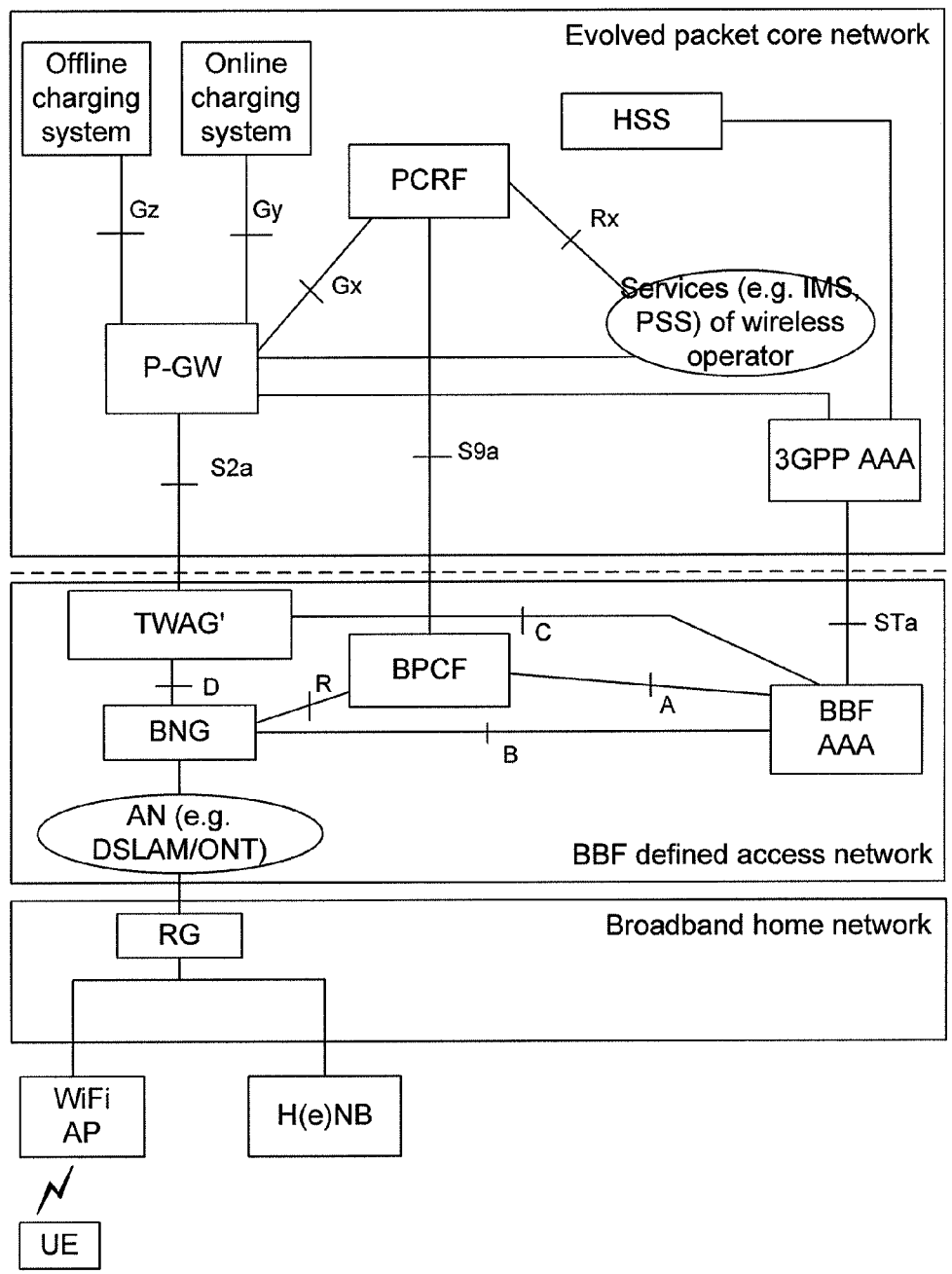
FIG. 1 is a schematic diagram illustrating an architecture in which a terminal device is connected to an EPC via a BBF fixed network according to the conventional art.
Figure 2:
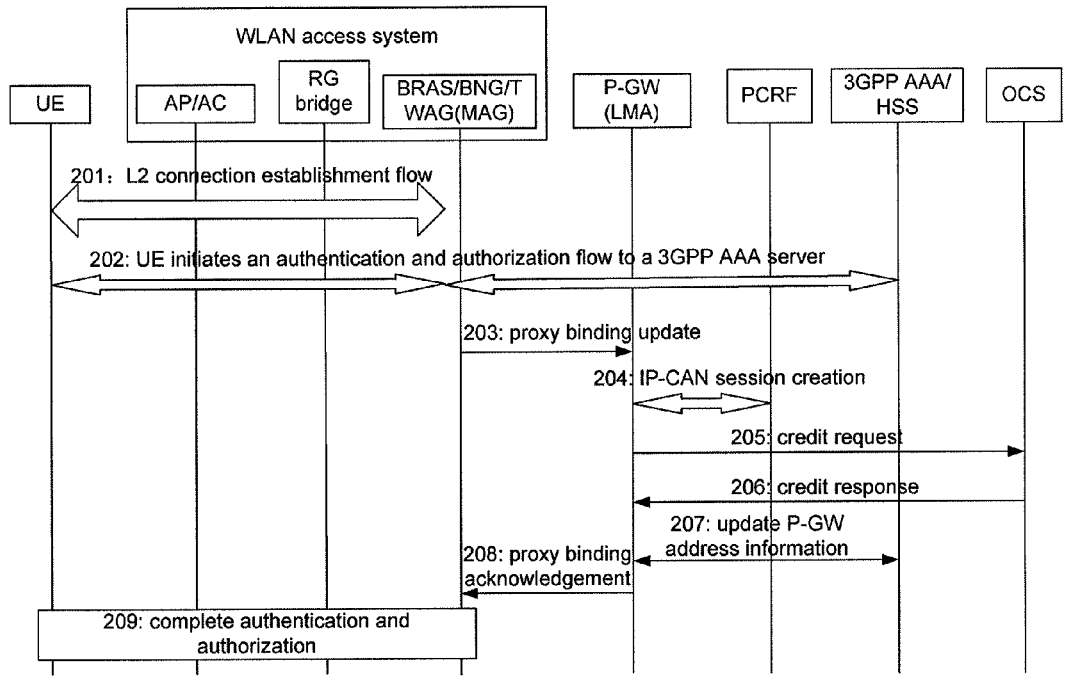
FIG. 2 is a flowchart illustrating the connection of a UE to an EPC via a fixed network in an RG bridge mode according to an embodiment of the disclosure.

As shown in FIG. 2, in an RG bridge mode, a user equipment (UE) is connected to an EPC via a fixed network, a TWAG providing the UE with the connection from a fixed network to the EPC is integrated with a Broadband Remote Access Server (BRAS), an S2a interface (an interface between a reliable non-3GPP access network and a P-GW) and a PMIPv6 protocol are used between the TWAG and the P-GW. In the bridge mode, each device connected via an RG corresponds to a Circuit ID. Specific implementation steps include:

Step 201: a layer-2 connection establishment flow is implemented between a UE and a reliable WLAN system, and during this process, a TWAG receives a Circuit ID which is sent by an RG and corresponding to the UE;

Step 202: the UE initiates an Extensible Authentication Protocol (EAP) authentication and authorization flow to a 3GPP AAA server;

Step 203: the TWAG is triggered by an EAP authentication and authorization message to initiate a PMIPv6 session creation flow from a P-GW, and the TWAG sends a Circuit ID to the P-GW by carrying the circuit ID in a PBU message;

Step 204: after receiving the PBU message, the P-GW creates a local binding association table entry to associate and bind the Circuit ID with PMIPv6, and an IP-CAN session creation operation is carried out between the P-GW and a PCRF; during this process, the P-GW sends the Circuit ID to the PCRF (the foregoing policy system), and the PCRF makes related policy rules according to the Circuit ID;

Step 205: if the System employs online charging, then the P-GW sends the circuit ID to an Online Charging System (OCS) by carrying the Circuit ID in a credit request message;

Step 206: the OCS charges according to the circuit ID received and carries the Circuit ID in a credit response message returned to the P-GW for confirmation;

Step 207: the P-GW updates P-GW address information for an HSS through the 3GPP AAA server;

Step 208: the P-GW carries the received Circuit ID in a PBA message and returns the PBA message to the TWAG as acknowledgement; and Step 209: the UE receives an authentication and authorization success message, then the flow of establishing the connection to the EPC is completed.

In the foregoing flow, the TWAG/BRAS serves as an MAG in a PMIPv6 architecture, and the P-GW serves as an LMA in a PMIPv6 architecture.

Figure 3:
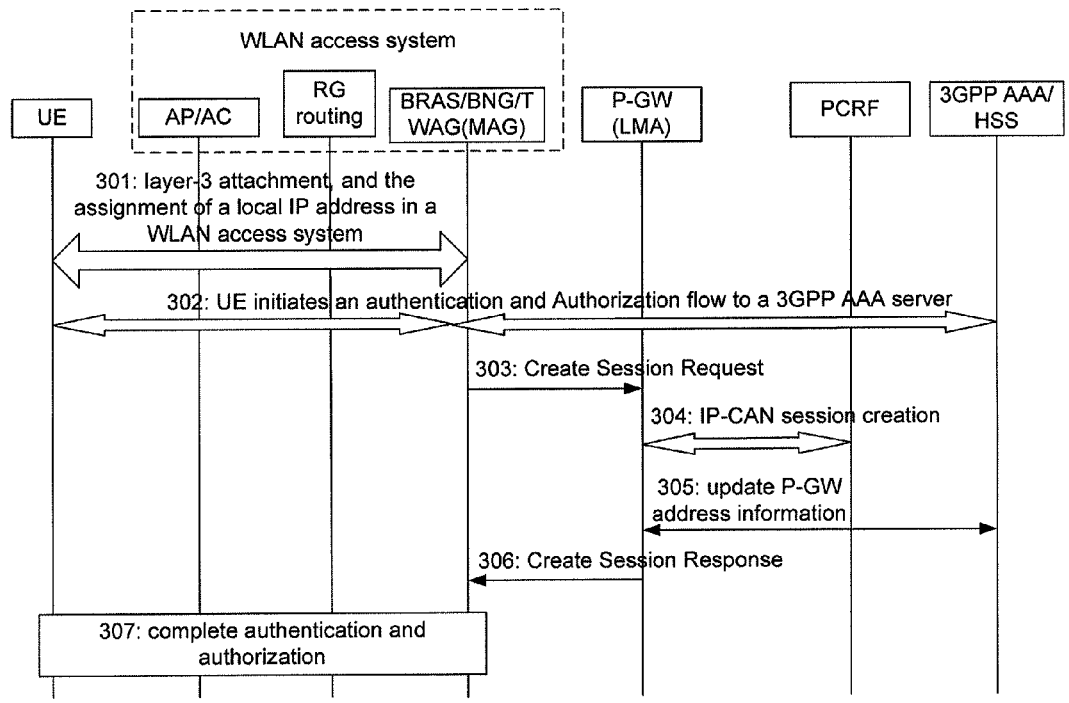
FIG. 3 is a flowchart illustrating the connection of a UE to an EPC via a fixed network in an RG routing mode according to an embodiment of the disclosure.

As shown in FIG. 3, in an RG routing mode, a UE is connected to an EPC via a fixed network; a TWAG providing the UE with the connection from a fixed network to the EPC is integrated with a BRAS, an S2a interface (an interface between a reliable non-3GPP access network and a P-GW) and a GTP mobility management protocol are used between the TWAG and the P-GW. In the routing mode, a Broadband Network Gateway (BNG) provides a public network address for an RG, and the RG having a Network Address Translation (NAT) function assigns a private network IP address for a connected device. In the routing mode, for a network, since a Circuit ID only identifies an RG, the address and the Circuit ID assigned to the RG by the BNG can both identify the RG, while the Circuit ID reflects the location information of the RG more. Specific implementation steps are as follows:

Step 301: a UE is connected to an RG, and the RG assigns a local IP address to the UE for the local authentication of a WLAN access network, and during this process, a TWAG receives a Circuit ID and/or an IP address (an IP address assigned to the RG by a BNG) from the RG;

Step 302: the UE initiates an EAP authentication and Authorization flow to a 3GPP AAA server;

Step 303: the TWAG is triggered by an EAP authentication and authorization message to initiate a GTP session creation flow from a P-GW, and the TWAG sends the Circuit ID and/or the IP address information of the RG to the P-GW by carrying the circuit ID and/or the IP address information of the RG in a Create Session Request message;

Step 304: after receiving the Create Session Request message, the P-GW associates the circuit ID and/or the IP address information of the RG with a GTP session, and an IP-CAN session creation operation is carried out between the P-GW and a PCRF, during this process, the P-GW sends the Circuit ID and/or the IP information of the RG to the PCRF (the foregoing policy system), and the PCRF makes related policy rules according to the Circuit ID and/or the IP information of the RG;

Step 305: the P-GW updates P-GW address information for an HSS through the 3GPP AAA server;

Step 306: the P-GW carries the received Circuit ID and/or IP information of the RG in a Create Session Response message and returns the Create Session Response message to the TWAG as acknowledgement; and Step 307: the UE receives an authentication and authorization success message, then the flow of establishing the connection to the EPC is completed.

In the foregoing flow, the TWAG/BRAS/BNG serves as an MAG in a PMIPv6 architecture, and the P-GW serves as an LMA in a PMIPv6 architecture.

Corresponding to embodiments of the method for notifying access network location information provided herein, an embodiment of a system for notifying access network location information is also provided; the system includes an MAG and an LMA in a PMIPv6 architecture or includes a local GTP peer and a correspondent GTP peer in a GTP architecture, wherein in the PMIPv6 architecture, the MAG is configured to send a circuit ID to the LMA by carrying the circuit ID in a PBU message; and in the GTP architecture, the local GTP peer is configured to send a circuit ID to the correspondent GTP peer by carrying the circuit ID in a Create Session Request message, a Modify Bearer Request message or a Delete Session Request message.

Preferably, in the PMIPv6 architecture, the LMA is configured to acquire the circuit ID carried in the PBU message and return the acquired circuit ID to the MAG by carrying the acquired circuit ID in a PBA message.

Preferably, in the PMIPv6 architecture, the LMA is configured to send the acquired circuit ID to a policy system which makes or configures corresponding policy rules according to the acquired circuit ID and/or a charging system which charges according to the acquired circuit ID.

Preferably, in the GTP architecture, the correspondent GTP peer is configured to return the acquired circuit ID to the local GTP peer by carrying the acquired circuit ID in a corresponding Create Session Response message, Modify Bearer Response message or Delete Session Response message.

In the GTP architecture, the correspondent GTP peer is configured to send the acquired circuit ID to a policy system which makes or configures corresponding policy rules according to the acquired circuit ID and/or a charging system which charges according to the acquired circuit ID.

The mentioned above is merely embodiments of the disclosure but is not to be construed as limiting the scope of the disclosure. It should be appreciated that any modification, equivalent or improvement without departing from the spirit and scope of the disclosure should all fall within the scope of the disclosure.

INDUSTRIAL APPLICATION

In embodiments of the disclosure, in a PMIPv6 architecture, an MAG sends a circuit ID to an LMA by carrying the circuit ID in a PBU message, and in a GTP architecture, a local GTP peer sends a circuit ID to a correspondent GTP peer by carrying the circuit ID in a Create Session Request message, a Modify Bearer Request message or a Delete Session Request message. In this way, an MAG can notify an LMA of the access network location information of a UE in a PMIPv6 architecture, and a GTP peer can notify a correspondent GTP peer of the access network location information of a UE in a GTP architecture.

What is claimed is:

1. A method for notifying access network location information, comprising:
    sending, by a local General Packet Radio Service Tunneling Protocol (GTP) peer, a circuit ID to a correspondent GTP peer by carrying the circuit ID in a Create Session Request message, a Modify Bearer Request message or a Delete Session Request message; and
    acquiring, by the correspondent GTP peer, the circuit ID carried in the Create Session Request message, the Modify Bearer Request message or the Delete Session Request message and returning, by the correspondent GTP peer, the acquired circuit ID to the local GTP peer by carrying the acquired circuit ID in a corresponding Create Session Response message, Modify Bearer Response message or Delete Session Response message,
    wherein the circuit ID comprises at least one of the following: a Router interface number, a Switching Hub port number, a Remote Access Server port number, a Frame Relay Data Link connection identifier, an Asynchronous Transfer Mode (ATM) virtual circuit number, and a Cable Data virtual circuit number.

2. The method according to claim 1, further comprising:
    after the local GTP peer sends the circuit ID to the correspondent GTP peer by carrying the circuit ID in the Create Session Request message, the Modify Bearer Request message or the Delete Session Request message,
    acquiring, by the correspondent GTP peer, the circuit ID carried in the Create Session Request message, the Modify Bearer Request message or the Delete Session Request message and sending, by the correspondent GTP peer, the acquired circuit ID to a policy system and/or a charging system; and
    making or configuring, by the policy system, corresponding policy rules according to the acquired circuit ID, and charging, by the charging system, according to the acquired circuit ID.

3. A method for notifying access network location information, comprising:
    sending, by a local General Packet Radio Service Tunneling Protocol (GTP) peer, a circuit ID to a correspondent GTP peer by carrying the circuit ID in a Create Session Request message, a Modify Bearer Request message or a Delete Session Request message; and
    acquiring, by the correspondent GTP peer, the circuit ID carried in the Create Session Request message, the Modify Bearer Request message or the Delete Session Request message and sending, by the correspondent GTP peer, the acquired circuit ID to a policy system and/or a charging system; and
    making or configuring, by the policy system, corresponding policy rules according to the acquired circuit ID, and charging, by the charging system, according to the acquired circuit ID,
    wherein the circuit ID comprises at least one of the following: a Router interface number, a Switching Hub port number, a Remote Access Server port number, a Frame Relay Data Link connection identifier, an Asynchronous Transfer Mode (ATM) virtual circuit number, and a Cable Data virtual circuit number.

4. A system for notifying access network location information, comprising a Mobile Access Gateway (MAG) and a Local Mobility Anchor (LMA) in a Proxy Mobile IPv6 (PMIPv6) architecture, or comprising a local General Packet Radio Service Tunneling Protocol (GTP) peer and an correspondent GTP peer in a GTP architecture, wherein the MAG is configured to send a circuit identifier (ID) to the LMA by carrying the circuit ID in a proxy binding update message; and the local GTP peer is configured to send a circuit ID to the correspondent GTP peer by carrying the circuit ID in a Create Session Request message, a Modify Bearer Request message or a Delete Session Request message, wherein the circuit ID comprises at least one of the following: a Router interface number, a Switching Hub port number, a Remote Access Server port number, a Frame Relay Data Link connection identifier, an Asynchronous Transfer Mode (ATM) virtual circuit number, and a Cable Data virtual circuit number.

5. The system according to claim 4, wherein the LMA is configured to acquire the circuit ID carried in the proxy binding update message and return the acquired circuit ID to the MAG by carrying the acquired circuit ID in a Proxy Binding Acknowledgement (PBA) message.

6. The system according to claim 5, wherein the LMA is configured to send the acquired circuit ID to a policy system which makes or configures corresponding policy rules according to the acquired circuit ID and/or a charging system which charges according to the acquired circuit ID.

7. The system according to claim 4, wherein the LMA is configured to send the acquired circuit ID to a policy system which makes or configures corresponding policy rules according to the acquired circuit ID and/or a charging system which charges according to the acquired circuit ID.

8. The system according to claim 4, wherein the correspondent GTP peer is configured to return the acquired circuit ID to the local GTP peer by carrying the acquired circuit ID in a corresponding Create Session Response message, Modify Bearer Response message or Delete Session Response message.

9. The system according to claim 8, wherein the correspondent GTP peer is configured to send the acquired circuit ID to a policy system which makes or configures corresponding policy rules according to the acquired circuit ID and/or a charging system which charges according to the acquired circuit ID.

10. The system according to claim 4, wherein the correspondent GTP peer is configured to send the acquired circuit ID to a policy system which makes or configures corresponding policy rules according to the acquired circuit ID and/or a charging system which charges according to the acquired circuit ID.

* * * * *